(12) United States Patent
Møllerhøj et al.

(10) Patent No.: US 8,951,494 B2
(45) Date of Patent: Feb. 10, 2015

(54) PROCESS AND APPARATUS FOR SULPHURIC ACID PRODUCTION

(75) Inventors: Martin Møllerhøj, Søborg (DK); Mads Lykke, Brønshøj (DK); Morten Thellefsen, Hillerød (DK); Peter Schoubye, Hørsholm (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 13/698,560

(22) PCT Filed: May 13, 2011

(86) PCT No.: PCT/EP2011/002379
§ 371 (c)(1),
(2), (4) Date: Nov. 16, 2012

(87) PCT Pub. No.: WO2011/147538
PCT Pub. Date: Dec. 1, 2011

(65) Prior Publication Data
US 2013/0058854 A1 Mar. 7, 2013

(30) Foreign Application Priority Data
May 27, 2010 (WO) ............... PCT/EP2010/003223

(51) Int. Cl.
*C01B 17/69* (2006.01)
*C01B 17/765* (2006.01)
(52) U.S. Cl.
CPC .................. *C01B 17/765* (2013.01)
USPC .......... 423/522; 423/532; 423/244.1
(58) Field of Classification Search
USPC .............. 423/210, 532, 522, 244.1
See application file for complete search history.

(56) References Cited

U.S. PATENT DOCUMENTS 3,671,194 A 6/1972 Roberts
4,016,248 A 4/1977 Vydra et al.
(Continued)

FOREIGN PATENT DOCUMENTS

CN 1384805 A 12/2002
CN 101001808 A 7/2007
(Continued)

OTHER PUBLICATIONS

CN101698470A, Liang et al., Apr. 28, 2010 (English translation).*
K. H. Daum, "Meeting the Challenge of High-Grade SO_2," Sulphur, No. 287, pp. 39-47, Jul. 1, 2003. (Abstract).

*Primary Examiner* — Ngoc-Yen Nguyen
*Assistant Examiner* — Anita Nassiri Motlagh
(74) *Attorney, Agent, or Firm* — Dickstein Shapiro LLP

(57) ABSTRACT

A process for the conversion of sulphur dioxide contained in a feed gas to sulphur trioxide, comprising the steps of a) alternatingly providing a first feed gas containing a high concentration of sulphur dioxide and a second feed gas containing a low concentration of sulphur dioxide as a process gas, b) preheating the process gas by heat exchange with a heat exchange medium, c) reacting the process gas in the presence of a catalytically active material in a catalytic reaction zone, d) converting at least in part the sulphur dioxide of the process gas into sulphur trioxide contained in a product gas in the catalytic reaction zone, e) cooling the product gas by contact with a heat exchange medium, wherein a thermal buffer zone is provided in relation to one of said process steps, providing thermal energy produced during super-autothermal operation for heating the process gas during sub-autothermal operation.

11 Claims, 10 Drawing Sheets

(56) References Cited

U.S. PATENT DOCUMENTS

| | | |
|---|---|---|
| 4,046,866 A | 9/1977 | Hurlburt et al. |
| 5,366,708 A | 11/1994 | Matros et al. |
| 5,480,620 A | 1/1996 | Cameron |
| 7,691,360 B2 | 4/2010 | Daum et al. |

FOREIGN PATENT DOCUMENTS

| | | | |
|---|---|---|---|
| CN | 101683973 A | | 3/2010 |
| CN | 101698470 A | * | 4/2010 |
| DE | 26 48 011 A1 | | 4/1978 |
| EP | 0 852 159 A2 | | 7/1998 |

* cited by examiner

PRIOR ART

PROCESS AND APPARATUS FOR SULPHURIC ACID PRODUCTION

The present invention is directed to the production of sulphuric acid. More particularly, the invention relates to an improved process for the conversion of sulphur dioxide contained in a feed gas to sulphur trioxide over a catalyst, in the event that the feed gas is highly varying with respect to the concentration of sulphur dioxide by accommodating the thermal effect of process transients such as the feed gas composition.

Industrial off-gases containing $SO_2$ are typically treated in a sulphuric acid plant, where the $SO_2$ is converted to $SO_3$ in a $SO_2$ conversion unit, often with two or more catalytic beds connected in series, hydrated and recovered as concentrated sulphuric acid. An example is production of sulphuric acid from $SO_2$ containing off-gases produced during roasting and smelting of non-ferrous metal ores containing sulphides of e.g. Cu, Mo, Zn, Pb and Ni, in a pyrometallurgical plant, where metal is extracted from ore by heating. During production $SO_2$ is produced from sulfides, and may be transferred to a sulphuric acid production plant. During operation the source of feed gas to the sulphuric acid plant may typically switch between roasting operation, i.e. oxidation of metal sulfide ores, and ore smelting under reducing conditions. During oxidation the sulphur dioxide level will typically be between 3 and 40 mole %, and during reduction the $SO_2$ level will typically be below 1 mole %, as illustrated in FIG. 1. In addition the feed gas may contain 2-10 mole % water vapour, oxygen, carbon dioxide, nitrogen and a small amount of $SO_3$ in the form of sulphuric acid mist. The large variations in $SO_2$ concentration and gas flow may lead to great disturbances and control difficulties in a state of the art downstream sulphuric acid plant and furthermore may require a plant designed for a much larger capacity than the average $SO_2$ flow.

The reason for this is the combination of (a) that the typical $SO_2$ oxidation catalyst requires a temperature above 370-400° C. to operate at a reasonable rate and about 600° C. for the highest rate and (b) that the oxidation is exothermal. With a feed gas concentration of $SO_2$ above 3-5% the reaction heat is sufficient for preheating the feed gas, and thus maintain autothermal operation at a high reaction rate, but with a lower feed gas concentration of $SO_2$ preheating may require an additional energy source.

From U.S. Pat. No. 7,033,565 a process is known for the production of sulphuric acid from a sulphur dioxide containing feed gas having varying $SO_2$ concentrations by adjusting $SO_2$ concentration in the feed gas of a sulphuric acid plant by exchange with an aqueous $SO_2$ solution; either by absorbing at least a part of $SO_2$ in the feed gas in an aqueous solution or by desorbing at least a part of $SO_2$ from said aqueous solution, dependent on the $SO_2$ concentration in the feed gas.

K. Hasselwanders (2008) (Sulphur 2008, Rome Italy, p. 111-118) reviews a number of other processes for the situation where the sulphur dioxide concentration varies. One proposal is a process where elemental sulphur is burned to increase the $SO_2$ level during periods with low sulphur content. Another proposal is a configuration in which a sulphuric acid plant is in operation at high sulphur levels, and where the sulphuric acid plant may be by-passed during periods of low sulphur content, during which a scrubber is used for collection of $SO_2$.

Furthermore it is known from the prior art (e.g. U.S. Pat. Nos. 7,691,360; 4,016,248; 4,046,866 and 3,671,194) to operate sulphur dioxide oxidation in stages, but such operation has only been used to control the distribution of heat development over the reactor especially for high sulphur dioxide inlet concentrations.

The known solutions are related to an additional cost, either because additional equipment for a second process are required on the plant or due to an increased cost of operation.

It is therefore an objective of the present invention to provide a sulphuric acid plant, which efficiently can operate on a feed gas having varying concentrations of sulphur dioxide in the feed gas, with low additional cost.

The present invention provides a process for production of sulphuric acid from a feed gas having a varying content of sulphur dioxide, by the realisation of the present invention that the key obstacle is the temperature variations of the catalytically active material, due to the reaction heat and the adsorption/desorption heat of $SO_2$ on the catalyst.

After realising this effect, an inventive scheme of operation of desulphurisation under such conditions is provided, actively accomodating the transients of the process in a way where the influence of the transients upon the process is reduced by providing a thermal buffer zone in the process with a substantially stable temperature.

In the broadest form the present invention relates to a process for the conversion of sulphur dioxide contained in a feed gas to sulphur trioxide, comprising the steps of a) alternatingly providing a first feed gas containing a high concentration of sulphur dioxide and a second feed gas containing a low concentration of sulphur dioxide as a process gas, b) preheating the process gas by heat exchange with a heat exchange medium, c) reacting the process gas in the presence of a catalytically active material, in a catalytic reaction zone, d) converting at least in part the sulphur dioxide of the process gas into sulphur trioxide contained in a product gas in the catalytic reaction zone, and e) cooling the product gas by contact with a heat exchange medium wherein a thermal buffer zone is provided in relation to one of said process steps, providing thermal energy produced during super-autothermal operation for heating the process gas during sub-autothermal operation, with the benefit of providing a more stable and energy efficient process than the prior art.

In a specific aspect of the present invention, the stability of temperature is ensured by collecting thermal energy in an appropriate heat exchange medium during super-autothermal operation of the sulphur dioxide oxidation, and storing this in a thermal buffer tank from which thermal energy may be withdrawn as a volume of warm heat exchange medium, during sub-autothermal operation of the sulphur dioxide oxidation process, while a thermal buffer tank of cold heat exchange medium is used for balance, with the benefit of storing energy from super-autothermal operation for use during sub-autothermal operation.

In a further aspect of the invention the temperature variation of the catalytic reaction zones is reduced by bypassing the hottest reaction zone during operation with low $SO_2$ concentration, which then due to the absence of flow is not cooled and becomes a thermal buffer zone, with the associated benefit of providing a zone of catalytically material at an appropriate temperature when a feed gas having an increased concentration of $SO_2$ is provided, such that autothermal operation is achieved in shorter time.

This may be done by defining a catalytic reaction zone, in accordance with the content of $SO_2$ in the feed gas, such that when the content of $SO_2$ is high, a high conversion is required and a high amount of heat is produced by the process, the process gas is directed to contact one amount of catalytically active material, and when the $SO_2$ content is lower, such that a lower conversion is required and no excess heat is produced, the process gas is directed to contact a limited amount of catalytically active material, such that the bypassed catalytically active material which is not contacted by the process gas having a low concentration of $SO_2$, and thus not cooled by this process gas.

By such a mode of operation, a high temperature catalytic reaction zone is maintained, as it will not be cooled by gas flow when the $SO_2$ content is too low for maintaining a section having a high temperature. This means that when high conversion is required, a hot section of the catalytic reaction zone remains, and may be used immediately with a high conversion. Thereby less variation in process conditions may be ensured, in spite of varying feed gas conditions, due to the thermal buffer effect of the bypassed catalytically active material.

In a further aspect of the invention the temperature variation of the catalytic reaction zones is reduced by passing a warm process gas over an inert thermal buffer during super-autothermal operation, and appropriate configurations for by-passing the inert thermal buffer during sub-autothermal operation, with the associated benefit of being able to configure the process for employing the heat of the thermal buffer during a transient period of sub-autothermal operation.

One embodiment provides a process for production of sulphuric acid from a feed gas having a varying content of sulphur dioxide by employing knowledge of one or more process conditions, in the operation of a catalytic reactor. The knowledge may include a measured or estimated values for one or more of the flow rate, the temperature in the feed gas, the composition of the feed gas and the source of the feed gas (which can reflect the $SO_2$ concentration in the feed gas), which may be used to ensure that the reactor is operated with a catalytic reaction zone matching the requirements for conversion of the sulphur dioxide contained in the process gas, at the temperature and other process conditions of the process gas. In one embodiment, a defined catalytic reaction zone may be provided by separating the catalytic reaction zone into several catalytic beds, and by-passing one or more of said beds.

In an alternative embodiment the catalytic reactor may have several inlets, through which the process gas may be directed to the catalyst. In this way further flexibility in the catalytic reaction zone may be provided. In such an embodiment the reactor may be configured for cooling the partially converted gas in a heat exchanger at the outlet of each section of catalytically active material, which will provide a lower temperature and thus push the equilibrium between $SO_2$ and $SO_3$ towards $SO_3$.

The present disclosure relates to a process for the conversion of sulphur dioxide contained in a process gas into sulphur trioxide, said process comprising flowing the process gas through a reactor having a catalytic reaction zone comprising a catalytically active material, oxidising at least in part the sulphur dioxide with oxygen into sulphur trioxide in the catalytic reaction zone, wherein said reactor is configurable for defining the catalytic reaction zone in dependence of one or more process parameters.

In selected embodiments of the disclosure, said process parameters are related to the process inlet conditions and may therefore be measured under non-corrosive conditions, and may be taken from the group consisting of temperature, sulphur dioxide concentration, sulphur trioxide concentration, pressure, mass flow of feed gas and volume flow of feed gas, each providing a detailed insight into the process, with improved process predictions.

Alternatively the knowledge of the source of the feed gas is used for determining said process parameter, which avoids the investment in analytical equipment.

In one embodiment, defining the catalytic reaction zone is accomplished by configuration of a flow of process gas to an operating and to a non-operating section of the catalytically active material, such that the non-operating section of the catalytically active material is contacted by 0-30% of the total flow of process gas, preferably 0.001% to 5% and even more preferably 0.01% to 1%.

In one embodiment of the disclosure said reactor comprises a first section of a catalytically active material, and a second section of a catalytically active material, which are connected in series and wherein the flow of process gas is configurable to at least partially by-pass at least some of said first section of catalytically active material, thereby defining the by-passed section of catalytically active material to be non-operating, and wherein the bypassed flow of process gas is at least 70% of the total flow of process gas, preferably at least 95%, even more preferably 99.9% of the total flow of process gas.

In an embodiment, the outlet of said first section of catalytically active material is configured for being connected to the inlet of said second section of catalytically active material, when said reactor is configured for the first section of catalytically active material to be operating, which may provide a simple construction of the reactor.

In an embodiment of the process at least a section of said reactor comprises two or more parallel channels of catalytically active material, such that said catalytic reaction zone configurable to comprise a number of parallel channels of operating catalytically active material while not comprising the remainder of the parallel channels of catalytically active material, with associated beneficial thermal effects.

In an embodiment of the process, said feed gas is during a fraction of operation obtainable from a high sulphur content source at a concentration above 3%, preferably above 5% and even more preferably above 10%.

In an embodiment of the process said feed gas is during a fraction of operation obtainable from a low sulphur content source, at a concentration below 3%, preferably below 1% and even more preferably below 0.5%.

An embodiment is also disclosed wherein said feed gas is obtained alternatingly from at least a first source and a second source, where said first source is a high sulphur content source and said second source is a low sulphur content source.

An embodiment is also disclosed wherein said feed gas is obtained alternatingly from at least a first source and a second source, wherein the ratio between the sulphur content of the feed gas from said first source and said second source, is higher than 1.5, preferably above 3 and even more preferably above 10, with the associated benefit that an increased ratio will provide higher benefits from the use of thermal buffer.

One embodiment of the disclosure relates to a process wherein said feed gas is obtained from a pyrometallurgical plant, from which the high sulphur content source is an off-gas from operation of a metal ore roaster and said low sulphur content source is an off gas from operation of a metal ore smelter electric furnace, with the associated benefit of reducing the cost of operating such processes.

One embodiment of the disclosure relates to the operation of a process for desulphurisation which during sub-autothermal conditions comprises the process steps of i) supplying a feed gas as a process gas to the process steps (ii) to (xi) if the concentration of sulphur dioxide is above the concentration required for auto-thermal operation of process steps (ii)-(v), and supplying said feed gas as a intermediate product gas optionally to the process step (vi) and to the process steps (vii) to (xi) if the concentration of sulphur dioxide is below the concentration required for auto-thermal operation of process steps (ii)(v), ii) preheating the process gas by heat exchange with a heat exchange medium, iii) flowing the low sulphur process gas through a reactor having a catalytic reaction zone comprising a catalytically active material, iv) converting at least in part the sulphur dioxide of the process gas into sulphur trioxide contained in an intermediate product gas in the catalytic reaction zone v) thermally contacting the product gas with a heat exchange medium vi) hydrating sulphur trioxide and condensing sulphuric acid in a condenser forming a intermediate product gas vii) preheating the intermediate product gas by heat exchange with a heat exchange medium, viii) flowing the low sulphur intermediate product gas through a reactor having a catalytic reaction zone comprising a catalytically active material, ix) converting at least in part the sulphur dioxide of the intermediate product gas into sulphur trioxide contained in a product gas in the catalytic reaction zone, x) thermally contacting the product gas with a heat exchange medium, and xi) hydrating sulphur trioxide and condensing sulphuric acid in a condenser, with the associated benefit of obtaining a very low sulphur dioxide emission during high sulphur feed gas concentrations.

In addition to these process embodiments, a reactor for the conversion of sulphur dioxide to sulphur trioxide according to any of the mentioned process embodiments is disclosed, comprising either appropriate configurations for by-passing elements operating as thermal buffers, appropriate inert thermal buffers such as a bed of inert material or appropriate heat exchange medium tanks configured for storing thermal energy, with the associated benefits discussed for the process configurations.

The disclosure further relates to a process for the production of sulphuric acid, said process comprising the steps of converting sulphur dioxide contained in a gas stream into sulphur trioxide as disclosed above, feeding the gas stream containing the generated sulphur trioxide to an absorber or a condenser and hydrating said sulphur trioxide-containing gas therein to form sulphuric acid.

As used herein thermal buffer shall be construed to cover a section or an element of the process plant which is configured or operated specifically such that the temperature of the section or the element varies substantially less than in regular configuration or operation.

As used herein process parameter shall be construed to cover any parameter related to the operating conditions of the process, including parameters obtainable by measurement such as concentration or temperature, parameters obtainable by process simulations or other calculation and parameters obtainable by knowledge of the process operation, such as the source of the feed gas.

As used herein super-autothermal or high $SO_2$ level shall be understood to mean a $SO_2$ level at which a sulphuric acid plant may operate in steady state with limited or no temperature decrease, whereas sub-autothermal or low $SO_2$ level shall be understood to mean a $SO_2$ level at which additional heat during steady state is required to ensure stable operation. While the terms high and low $SO_2$ level indicate sole dependence on the $SO_2$ concentration, it is emphasized that other parameters known to the skilled person define whether operation is sub-autothermal or super-autothermal, including flow rate and flow pattern, physical shape of catalyst and process equipment and the chemical composition of the feed gas as well as the catalyst.

As used herein the term steady state conditions shall be understood to mean the operation under unchanged input conditions, after all time dependent factors of the process have reached a level where they show no substantial change.

As used herein the term transient conditions shall be understood to mean the operation shortly after changed process conditions, where one or more time dependent factors of the process are still changing.

As used herein autothermal operation shall refer to whether the actual operation is autothermal and not whether the conditions are such that steady state operation is autothermal.

As used herein a $SO_2$ conversion unit shall be understood as the process equipment and the process comprising an inlet of process gas, catalytic conversion of $SO_2$ to $SO_3$, as well as the related supporting processes including heat exchangers.

As used herein, a reactor shall be understood to be synonomous with a reactor system, and may contain one or more physical units.

As used herein sulphuric acid plant shall be understood as the process equipment and the process comprising an inlet of feed gas, catalytic conversion of $SO_2$ to $SO_3$ and hydration of $SO_3$ to form sulphuric acid, as well as the related supporting processes including heat exchangers.

As used herein, a catalytically active material may be catalyst in any form and shape, including but not limited to catalyst pellets, extruded catalyst, monolithic catalyst and catalysed hardware. The catalytically active material may comprise any substance known in the art to catalyse the oxidation of $SO_2$ to $SO_3$, including but not limited to the following active substances alkali-vanadium, platinum, cesium, ruthenium oxide, and activated carbon.

As used herein a "section of catalytically active material" shall not be construed as if that section is contributing to the conversion of $SO_2$ at the relevant time (i.e. an operating section of catalytically active material); it may also be construed as a part which is by-passed or in other ways not contributing significantly to the $SO_2$ conversion (i.e. a non-operating section of catalytically active material).

As used herein a defined catalytic reaction zone shall be understood to mean either all of the catalytically active material in the sulphur dioxide conversion reactor, or a defined sub-section of the catalytically active material. The reactor may be designed such that the process gas only enters the defined sub-section of catalytically active material, and is substantially diverted from the remainder of the reactor, by means of valves or other means of flow control. Substantially diverted shall be construed as being diverted to such an extent that the conversion contribution relating to that flow is less than 30%.

BRIEF DESCRIPTION OF THE DRAWINGS

The process according to the invention is now described in further detail with reference to the drawings, in which.

Feed gases to sulphuric acid plants from a pyrometallurgical process may be supplied cold, often from 20-50° C., they may contain from about 0.1% $SO_2$ to about 40% $SO_2$, and they have to be treated according to environmental limits for emission of sulphur dioxide to the atmosphere. In many countries legal limits for sulphur dioxide emission are imposed, which may require a very efficient process for $SO_2$ removal. Due to the kinetics of the $SO_2$ to $SO_3$ conversion, the $SO_2$ containing process gas has to be heated to about 400° C. before it is led to the catalytic reaction zone, for the reaction to run at a reasonable rate.

While the process gas may be partly heated by e.g. heat exchange with hot cooling air from a wet gas sulphuric acid condenser, the final heating to about 400° C. typically employs the reaction heat from the converter, as this may be the only place in the sulphuric acid plant, where such high temperatures are available. In particular, a high temperature outlet from the first catalytic reaction zone is advantageous as temperatures well above 400° C. are required to heat the feed to 400° C.

When the $SO_2$ content in the feed gas is low, the reaction heat is limited and therefore insufficient to heat the feed gas. Energy will have to be added, typically by direct or indirect support-firing.

Figure 1:
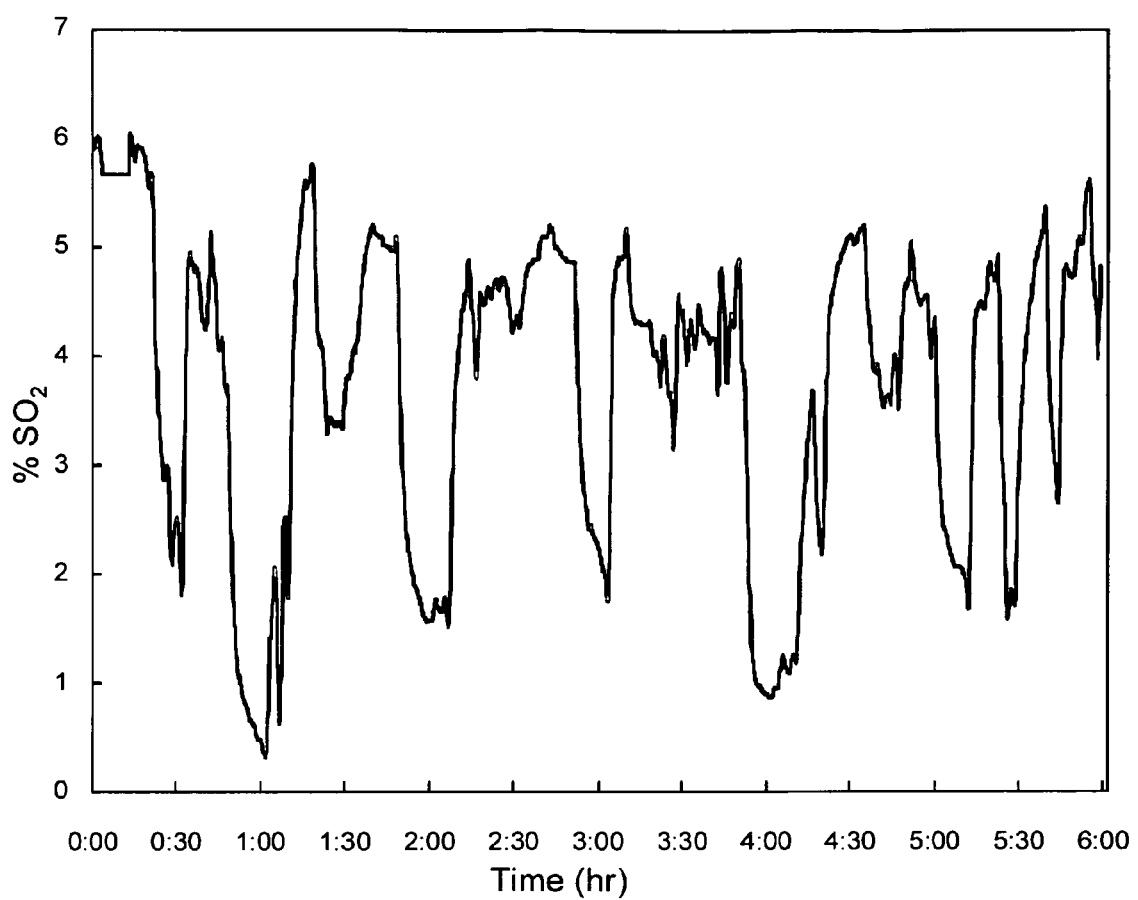
FIG. 1 illustrates an example of the variations of sulphur dioxide concentration in the feed gas.
Figure 2:
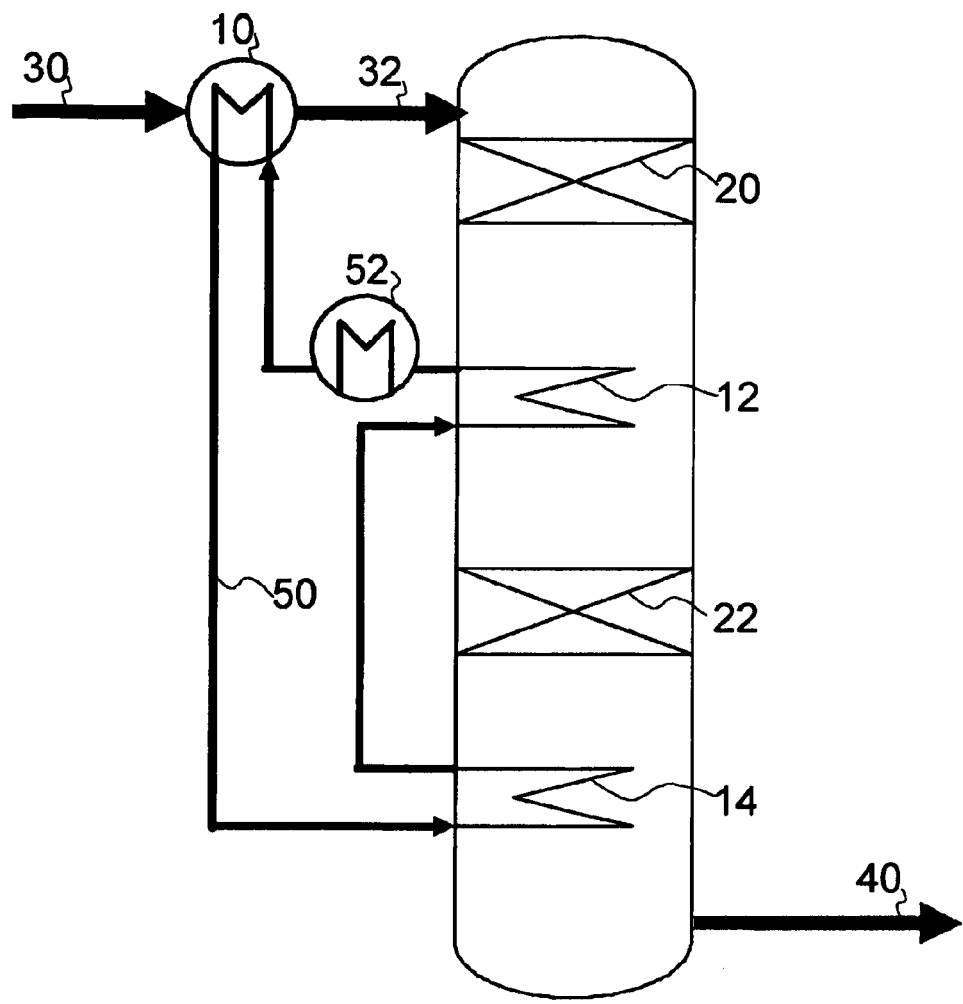
FIG. 2 represents a sulphur dioxide oxidation reactor according to the prior art.

A typical process layout according to the prior art can be seen in FIG. 2. At steady state processing, cold feed gas is heated in the heat exchanger 10 to about 400° C. The hot process gas is led to the converter and the $SO_2$ is partly oxidized in the first catalytic reaction zone 20 typically generating a temperature increase of about 25° C. for every 1% $SO_2$ in the feed. To have a high conversion from the inlet 30 to the outlet 40 of the converter, the equilibrium between $SO_2$ and $SO_3$ makes it necessary to cool the process gas before further conversion can be achieved. The heat exchanger 12 (also called the interbed cooler) therefore cools the process gas to around 400° C. before the gas is led to the second catalytic reaction zone 22 to improve conversion. If even higher conversion is required, a further cooling/conversion step can be added. Finally the product gas is cooled in the heat exchanger 14 to a temperature above the dew point temperature of sulphuric acid, typically 270-300° C.

For cold $SO_2$ feed gasses, a heat recovery system 50 with molten salt as energy carrier is often the most flexible layout. In the example of FIG. 2, the molten salt is heated to medium temperature in the heat exchanger 14 and to high temperatures in the heat exchanger 12, where after the hot salt is used to heat the cold feed gas in the heat exchanger 10. In order to obtain a process gas temperature of e.g. 400° C. at the inlet 32 of the converter, the hot salt need to be above 400° C. and preferably above 430° C. In order to heat the molten salt to e.g. 430° C., the process gas temperature outlet from the first catalytic reaction zone 20 need to be above 430° C., preferably more than 20° C. above, i.e. above 450° C. This means that for the process to run without support fire, the temperature increase over the first catalytic reaction zone 20 should preferably be above 50° C. which means that the process gas should preferably contain more than 2.5% $SO_2$ at the inlet 32.

The dynamic effects on conversion and temperatures have to be considered in converter units treating feed gases with varying compositions and flow, as will be demonstrated in the following analysis of a change from high to low $SO_2$ concentration.

When a converter unit has been operating with a feed gas having a high $SO_2$ concentration for a period of time, the temperature of the first catalytic reaction zone 20 will be high. This is an advantage in the sense that the oxidation reaction will be very fast and only require a small amount of catalyst to go to the point where it is limited by the equilibrium.

When the feed gas 30 is changed to low $SO_2$ content, the hot catalyst will continue converting the $SO_2$, but the reaction heat produced will be insufficient to maintain the temperature and the catalytic reaction zone 20 will be gradually cooled, resulting in a decreasing temperature at the outlet of the first catalytic reaction zone 20 and at some point in time the temperature will be too low for heating of the feed gas and support heat 52 will have to be provided, either in the heat exchange circuit or in the process gas line.

After operating with a feed gas 30 having a low $SO_2$ concentration for a period of time, the temperature of the first catalytic reaction zone 20 will be stable, but relatively cool. Conversion will be sufficient due to the low feed gas $SO_2$ content, provided extra heat is provided, e.g. by support firing.

When the feed is changed back to high $SO_2$ content several problems may arise. First of all, the first catalytic reaction zone 20 will initially be cold and the conversion reaction may therefore be too slow to allow sufficient conversion of $SO_2$ in the feed gas 30. This may result in two problems; 1) Due to the low conversion the $SO_2$ concentration at the outlet 40 may be higher than permitted. 2) The $SO_2$ which is not converted in the first catalytic reaction zone 20 may be converted in the second catalytic reaction zone 22, resulting in a much higher heat development than the ideal design of the converter unit would contemplate, and therefore such a high temperature may either damage that section of the converter or require a choice of expensive materials having wide safety limits. Furthermore, for process control it is a problem that the variations of the heat recovered in the heat exchanger 12 and the heat exchanger 14 are hard to predict, since the thermal profile will be dependent on the time the converter has been running on a feed gas 30 having a low $SO_2$ concentration.

Figure 3:
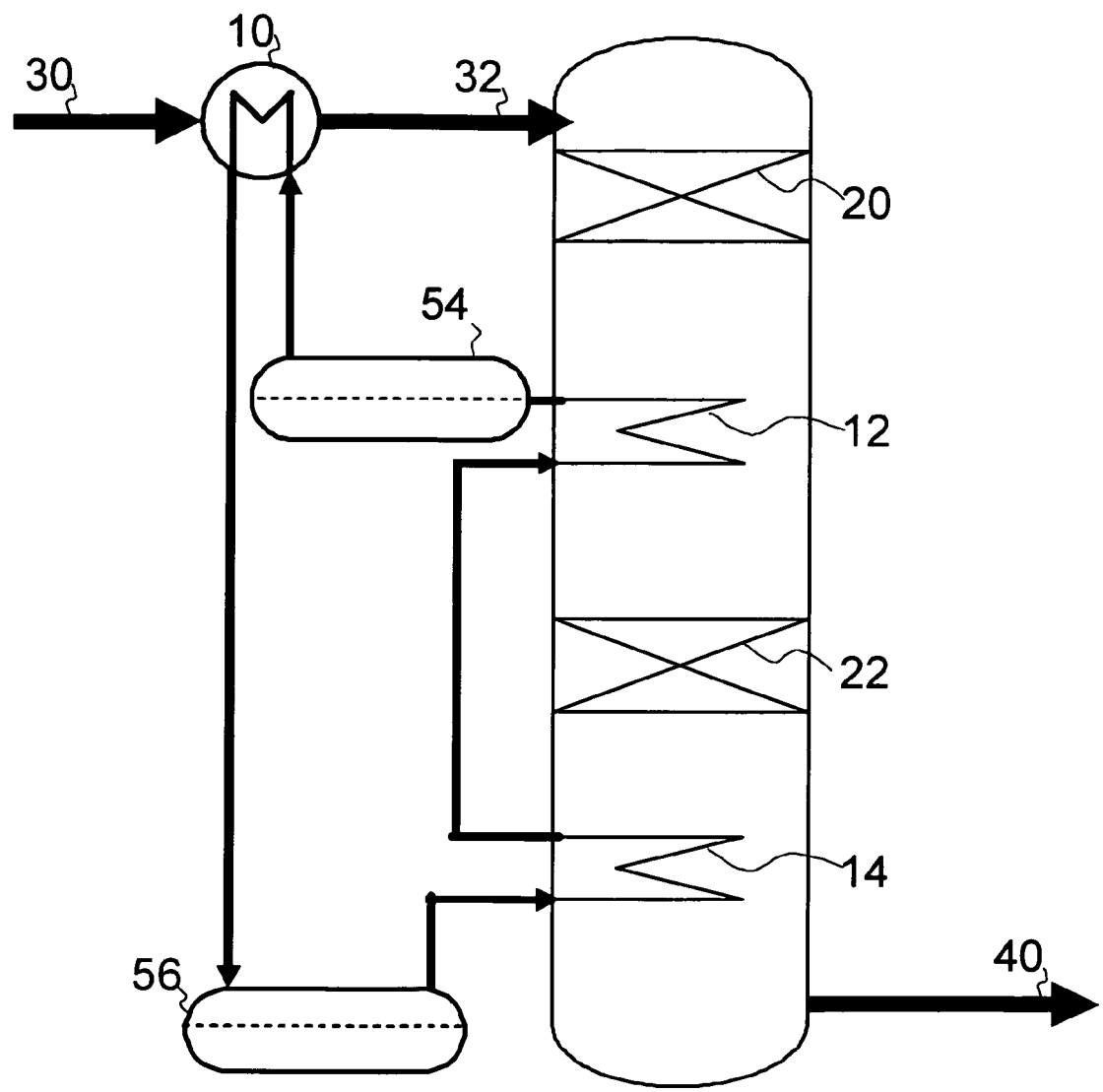
FIG. 3 represents a sulphur dioxide oxidation reactor configured with a thermal buffer in the heat exchange circuit.

In order to accommodate some or all of these weaknesses, and especially to provide increased thermal efficiency of the process, a preferred embodiment of the current disclosure suggests adding an excess thermal capacity to the heat exchange medium e.g. by heating an excess volume of a heat exchange medium such as a molten salt during super-autothermal operation, and consuming this excess volume during sub-autothermal operation, as illustrated in FIG. 3, and in the following text.

During operation according to the prior art a heat exchange medium is circulated for cooling the warm product gas in 12 and 14 and heating the feed gas in 10. According to the present disclosure, as illustrated in FIG. 3, during a period of super-autothermal operation a net flow of warm heat exchange medium may be directed to a tank for warm heat exchange medium 54, and a net flow may be directed from a tank for cold heat exchange medium 56 for cooling the hot product gas in heat exchangers 12 and 14.

Similarly during a period of sub-autothermal operation a net flow of warm heat exchange medium may be directed from the tank for warm heat exchange medium 54 to supply heat for the feed gas pre-heating in 10, and a net flow may be directed from a tank for cold heat exchange medium 56 for cooling the hot product gas in 12 and 14.

The specific implementation of the buffering system can be made in many ways. One possibility is to operate the tanks for warm and cold heat exchange medium as balance tanks, i.e. during net supply to the tank, to direct all heat exchange medium to the tank and only withdraw the amount required, whereas another implementation is to transfer only the excess heat exchange medium to the tank for heat exchange medium. Similarly for the case where a net withdrawal from the tanks for heat exchange medium 54 or 56 to the circuit of heat exchange medium is required, this may be implemented by supplying the difference through a single line, or by operating the tank as a balance tank with less volume supplied than is withdrawn from the balance tank.

In addition to providing actual volume of heat exchange medium, the thermal buffer may also be provided by thermal contact with an appropriate material having a melting point at a temperature around 450° C. such that the phase change provides the thermal buffer capacity.

In a further embodiment of the current disclosure we suggest bypassing the first catalytic reaction zone when the $SO_2$ content in the feed gas is low (FIG. 4), since operation without a by-pass (according to the prior art) will cool the first catalytic reaction zone during periods with a low $SO_2$ content in the feed gas, resulting in incomplete reaction during a transient period after a change from low to high $SO_2$ content. By-passing the first catalytic reaction zone 20 has the function of providing a thermal buffer, since the first catalytic reaction zone 20 will not be cooled, and thus when the feed gas $SO_2$ content is increased, super-autothermal is established much earlier due to the thermal buffer effect of the first catalytic reaction zone 20.

Figure 4:
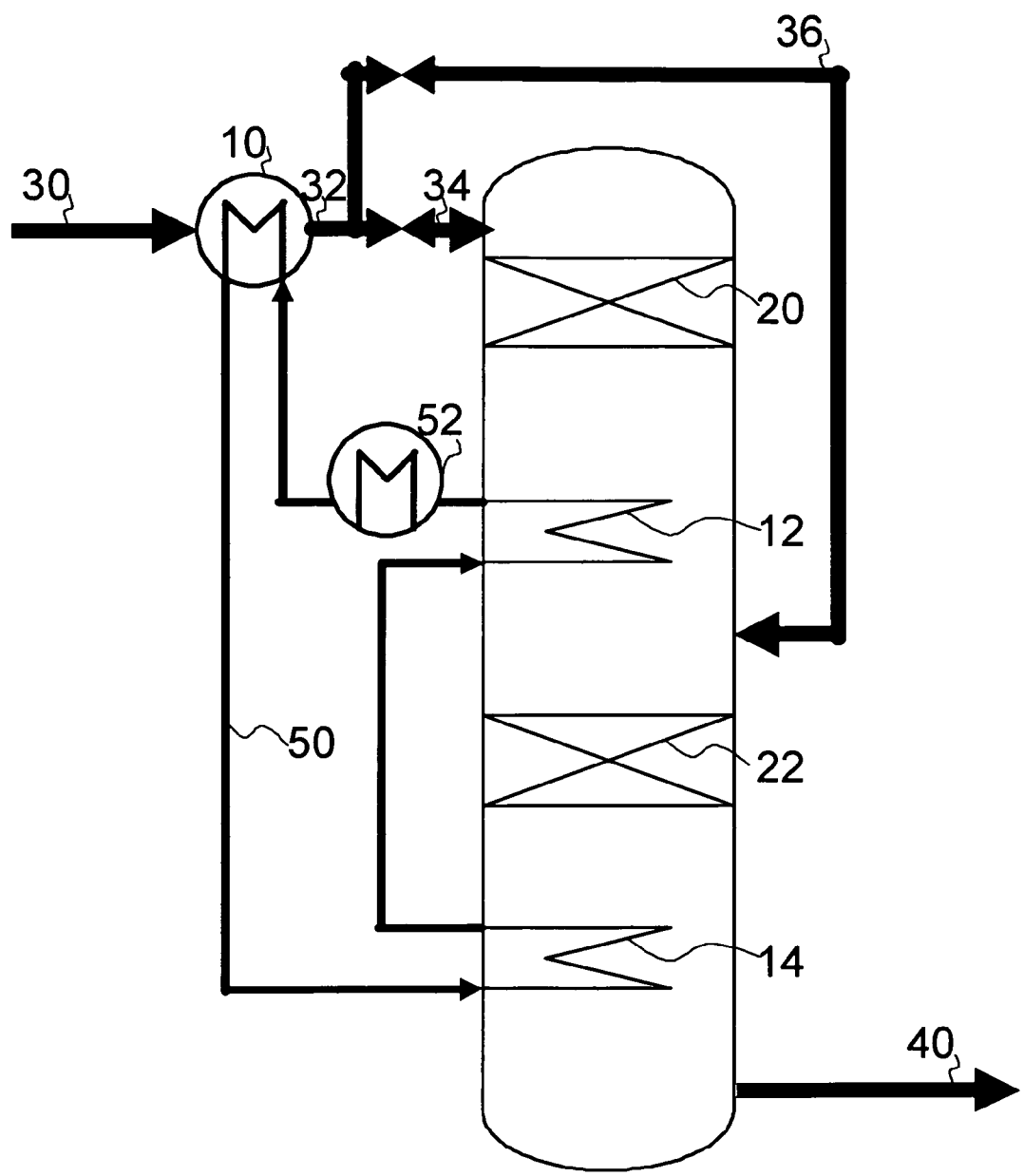
FIG. 4 represents a sulphur dioxide oxidation reactor having a by-pass line according to an embodiment of the disclosure.

During a period with high $SO_2$ concentration in the feed gas 30 the temperature of the first catalytic reaction zone 20 will be increased as in the prior art. During a period with low $SO_2$ concentration in the feed gas 30, a process layout without gas flow in the first catalytic reaction zone 20, as illustrated in FIG. 4, will substantially preserve the high temperature in the first catalytic bed 20, as little or no heat is drawn from the bed, by a moving gas. At a later stage when the first catalytic reaction zone 20 is not by-passed, this may assure a good conversion when it is most required, i.e. during periods with a feed gas 30 having a high $SO_2$ concentration, which typically also are related to a high volumetric flow. This will eliminate undesired $SO_2$ emission peaks of the product gas. Compared to the process of the prior art, the $SO_2$ conversion may be slightly lower when the $SO_2$ content in the feed gas is low and the first catalytic reaction zone 20 is by-passed through 36, but conversion may still be sufficient to reduce the low $SO_2$ level to below environmental requirements.

One additional benefit of the embodiment of FIG. 4 is that by preserving the temperature profiles in the converter unit, it may become simpler to predict how much energy will be available for feed gas preheating in heat exchanger 10 or required in heat exchanger 52, hence simplifying process control, and possibly also ensuring a higher level of overall heat recovery.

A process layout according to the invention may also assure that high temperature increases due to $SO_2$ conversion can be isolated to the first catalytic reaction zone 20, and thus enable the use of less expensive materials in the second catalytic reaction zone 22.

A further alternative process layout may also include a third catalytic reaction zone in order to allow a more complete conversion, especially if the third catalytic reaction zone is operated at a lower temperature than the sec- and catalytic bed 22. In this case one or more of the first and the second catalytic reaction zones may be by-passed.

A further possible process feature is the use of a small flow of feed gas or other gas through a section of non-operating catalytically active material. Such a flow in the same direction as that of the feed gas when the section of catalytically active material is operating, will have a small cooling effect, but it will at the same time counteract convective heat transfer internally in the catalytically active material, and thus contribute to maintaining a thermal buffer section with high temperature and thus high reaction rates.

Figure 8:
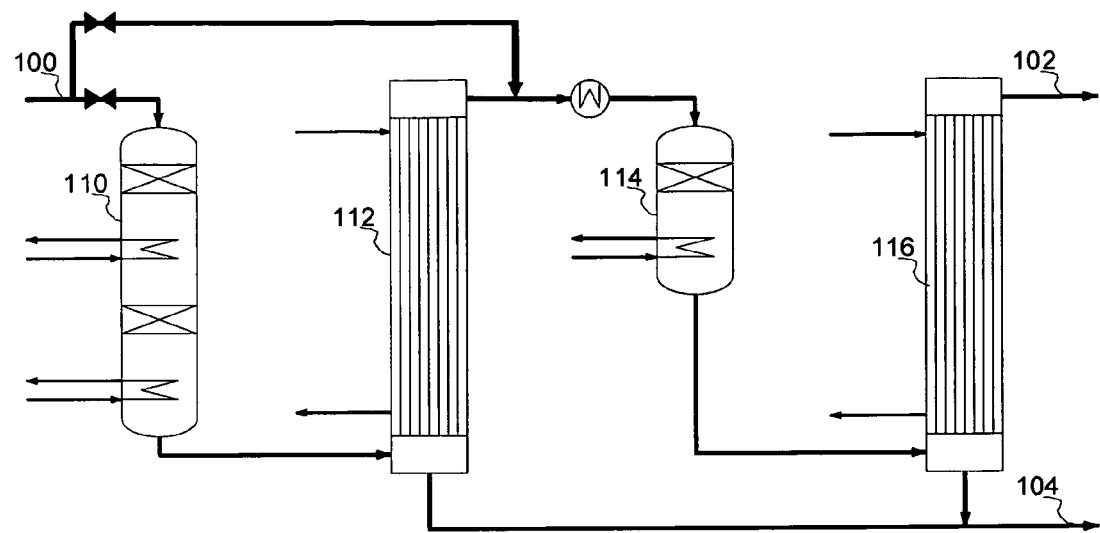
FIG. 8 represents a sulphur dioxide oxidation plant with two condensation column in which a first oxidation reactor and a optionally a first condensation column are bypassed according to an embodiment of the disclosure.

For a process having a feed of a feed gas rich in $SO_2$ 100 producing a clean product gas 102 and concentrated sulphuric acid 104, operating with two catalytical reactors 110 and 114, two condensation columns 112 and 116, according e.g. to U.S. Pat. No. 7,361,326, the thermal buffer may be defined by the first catalytical reactor 110, which may be bypassed during sub-autothermal operation, as illustrated in FIG. 8. In such a configuration during sub-autothermal operation it may be chosen to by-pass the first reactor 110, and optionally also the first condensation column 112. Bypassing the first condensation column 112 may be more energy efficient, but it may be associated with stability problems.

Figure 9:
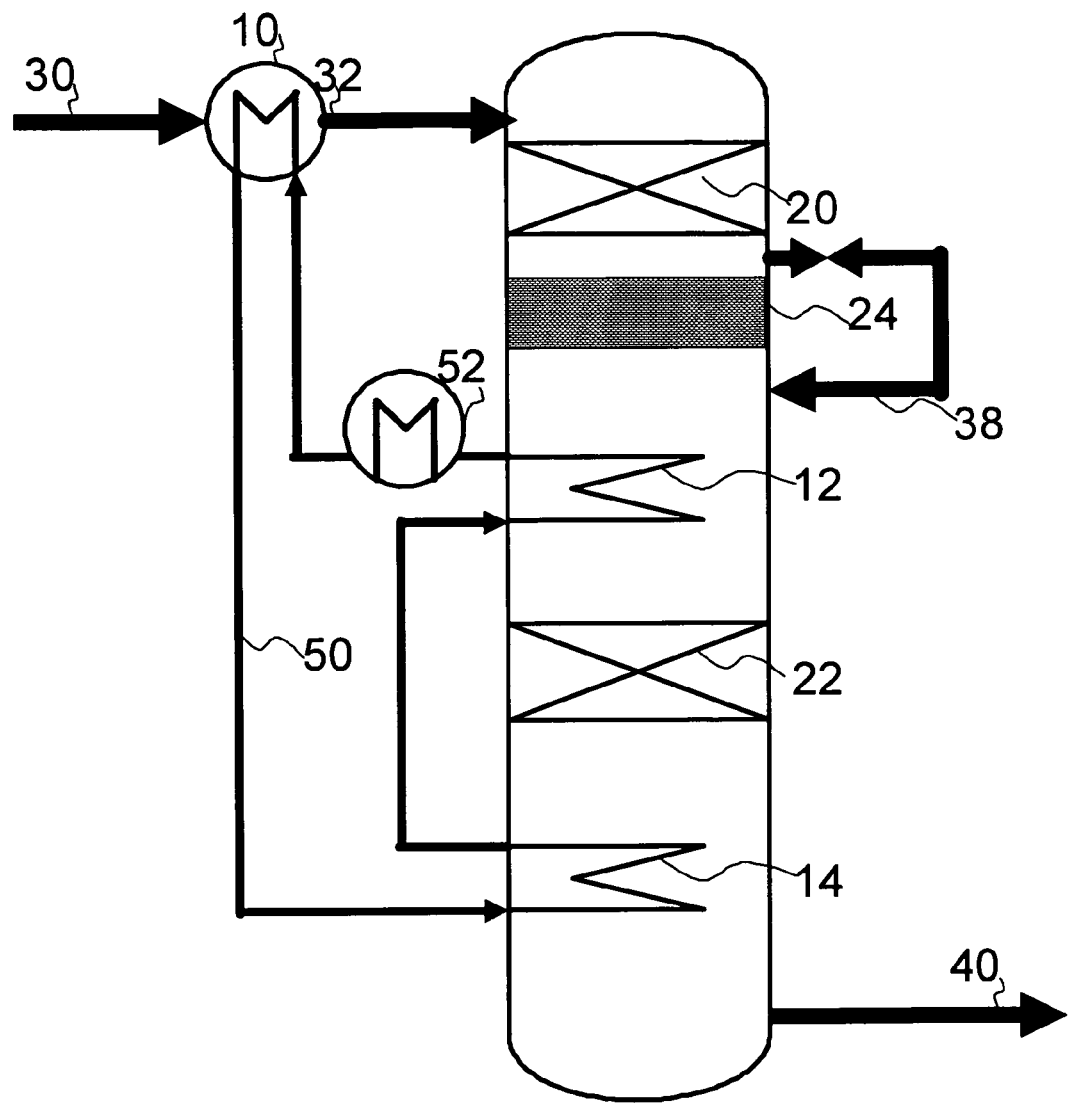
FIG. 9 represents a sulphur dioxide oxidation reactor having an internal inert thermal buffer and a by-pass line according to an embodiment of the disclosure.

An appropriate thermal buffer may also be implemented according to FIG. 9 by providing an inert thermal buffer section 24 within the reactor, in such a manner that the heat developed during super-autothermal operation is stored in this inert thermal buffer section 24. During sub-autothermal operation the heat of the inert thermal buffer section 24 is used to heat the reacting gas and to provide energy for the feed gas via the interbed cooler 12.

During the transient period with high $SO_2$ concentration but low temperature in the catalytically active material 20 as well as in the inert thermal buffer 24 the by-pass 38 may be opened, such that autothermal operation is reached at an earlier stage, as energy is not transferred to the inert thermal buffer 24. When the temperature of the by-pass gas supplies sufficient energy for pre-heating the feed-gas, the by-pass can be partially closed in order to heat the inert thermal buffer 24. During steady state super-autothermal operation the by-pass 38 can be fully closed.20

Figure 10:
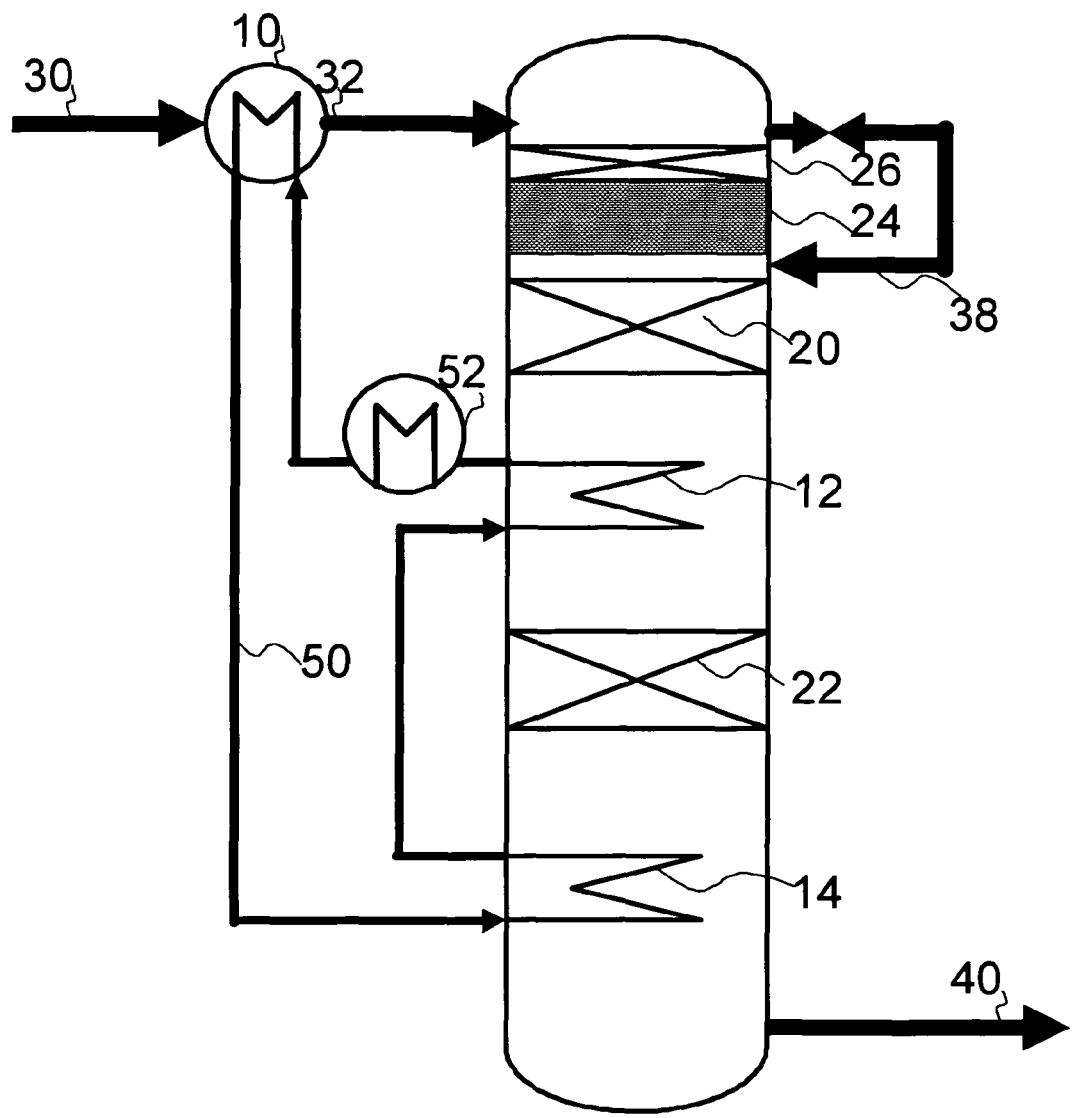
FIG. 10 represents a sulphur dioxide oxidation reactor having a prebed of catalytically active material an internal inert thermal buffer and a by-pass line according to an embodiment of the disclosure.

In a similar embodiment, a thermal buffer can also be implemented according to FIG. 10 by providing a pre-bed of catalytically active material 26, upstream an inert thermal buffer section 24 within the reactor. During super-autothermal operation energy from the interbed cooler 12 is available for preheating the feed gas in 10. The feed gas may then be split between the pre-bed of catalytically active material 26 and a partial by-pass 38 in such a manner that the gas oxidized in the pre-bed of catalytically active material 26 is heated by reaction and heats the thermal buffer 24. The outlet from the thermal buffer 24 can then be mixed with the by-pass 38 for obtaining an appropriate temperature for reaction to take place over the first bed of catalytically active material 20. Heat may be withdrawn in the interbed cooler 12, and reaction can continue in the second bed of catalytically active material 22 with the result that further heat can be withdrawn in 14.

During sub-autothermal operation the pre-bed of catalytically active material 26 and the inert thermal buffer 24 can also be partially bypassed via 38, and by mixing of cold feed gas and oxidized feed gas heated in the thermal buffer 24 an appropriate temperature for the reaction over the first bed of catalytically active material 20 can be obtained. In this case the inert thermal buffer 24 is gradually cooled with time such that an appropriate control of the by-pass flow, in dependence of the temperature at the inlet to the first bed of catalytically active material 20 can be defined.

During the period following the change from sub-autothermal conditions to super-autothermal conditions, the first bed of catalytically active material 20 is cold and therefore there may be insufficient heat for pre-heating the feed gas in the heat exchanger 10. In this case as in the other cases of this embodiment, the by-pass flow of feed gas 38 and the interbed cooler 12 may be controlled in dependence of the temperature of the feed to the first bed of catalytically active material 20 such that the oxidation of sulphur dioxide over all catalytically active beds is sufficient.

The skilled person will realise that combinations of the embodiments are possible, especially of the embodiment of FIG. 3 and FIGS. 4-10.

In a sulphuric acid plant operating with varying $SO_2$ contents in the feed gas, a further complication is the fact that $SO_2$ oxidized to $SO_3$ may be adsorbed on a vanadium catalyst, as a sulphate salt. The adsorption is highly exothermal, and contributes therefore further to the complex dynamic interrelations between concentrations and temperature, and is thus a further reason that a variation in temperature and $SO_2$ inlet level is not desired.

Example 1 is an illustration of the design of a sulphuric acid processing unit according to the prior art (i.e. FIG. 2) which is designed to be capable of handling two different off-gases (e.g. off-gases from a metal ore roaster and a metal ore smelter electric furnace respectively) from a pyrometallurgical plant as feed gases:

89000 Nm3/h, 5.4% $SO_2$, 13.3% $O_2$ and 7.7% $H_2O$ (Feed gas 1)

24000 Nm3/h, 0.46% $SO_2$, 18.0% $O_2$ and 7.2% $H_2O$ (Feed gas 2)

Component balances are inert, i.e. $N_2$, Ar and $CO_2$

Emission requirements are less than 1000 ppmv $SO_2$ in the stack gas which correspond to about 900 ppmv at the outlet of the converter.

The plant to which the design is related is located above sea level and the reference pressure is 870 mbar, ambient temperature is 40° C.

In the example the catalytic reaction zone is implemented as two beds of catalytically active material. As the dimensions of the second bed are defined substantially by the inlet temperature, the $SO_2/SO_3$ equilibrium and reaction kinetics, the second catalyst bed must have an inlet $SO_2$ concentration less than 0.71% when operating with feed gas 1 in order to meet the $SO_2$ emission requirements for the plant at the outlet of the second catalyst bed 40, (less than about 900 ppmv). Inlet temperature is set to 400° C. and the bed diameter is sized for a pressure loss of about 8 mbar over the first bed.

Based on these design criteria the dimensions are:

TABLE 1

|  | Catalyst Bed 1 | Catalyst Bed 2 |
| --- | --- | --- |
| Diameter (m) | 10 | 10 |
| Height (m) | 1.13 | 2.30 |
| Catalyst Volume (m3) | 88.7 | 180.1 |

The catalyst used in the design is VK-WSA, 12 mm Daisy from Haldor Topsoe A/S, Denmark, which is an alkali-promoted vanadium pentoxide catalyst, having a typical active composition of 6-8% $V_2O_5$, 7-12% K and 1-2% Na.

The steady state performance and the initial Low-High Transient performance (i.e. the temperature profile corresponding to feed gas 2 steady state, with the inlet composition of feed gas 1) was:

TABLE 2

|  | High, Steady State | Low, Steady State | Low-High Transient |
| --- | --- | --- | --- |
| $SO_2$ Inlet first bed | 5.4% | 0.46% | 5.4% |
| $SO_2$ Outlet first bed | 0.71% | 50 ppmv | 2.6% |
| $SO_2$ Outlet second bed | 900 ppmv | 30 ppmv | 12300 ppmv |
| T Inlet first bed | 400° C. | 400° C. | 400° C. |
| T Outlet first bed | 533° C. | 414° C. | 414° C. |
| T Inlet second bed | 400° C. | 400° C. | 400° C. |
| T Outlet second bed | 417° C. | 400° C. | 400° C. |
| Support fuel | 0 kg/h | 122 kg/h | 171 kg/h |

It can be seen, that when $SO_2$ content of the feed gas is changed from Low to High, the converter is initially not able to convert the $SO_2$ to the level required to meet the emission requirements even though the steady state performance is satisfactory and support fuel is used to ensure sufficient inlet temperature.

The support heat may be provided by firing of a support fuel—either in the heat exchange circuit 52 or in the process gas line 30 or 32. To do this 122 kg/h propane is required during sub-autothermal conditions to maintain a feed temperature in 32 of 400° C., and 171 kg/h propane during a transient from sub-autothermal to super-autothermal conditions.

In the transient case with feed gas 1, the temperature at the outlet from the first catalyst bed 20 is too low to supply heat for the heating of the feed gas and support heat 52 will have to be continued until steady state is reached.

An illustration of an embodiment of the present disclosure is presented below, in the form of the processing unit from the previous example, but operated according to FIG. 3, with heat exchange to a heat exchange media buffer tank. The thermal conditions will correspond to a case where support fuel is provided, and therefore a revised reactor design is provided in Table 3, to ensure that the $SO_2$ concentration is below 1000 ppmv even in the transient period. The design of Table 3 assumes either the provision of support fuel, or a thermal buffer based on a salt such as Hitec solar salt from Coastal Chemical Co. of Houston US, based on sodium nitrate and potassium nitrate. Alternatively the thermal buffer may also be other salts including nitrite and nitrate salts of sodium and potassium, or any other appropriate material being a liquid in the temperature range around 450° C.

TABLE 3

|  | Catalyst Bed 1 | Catalyst Bed 2 |
|---|---|---|
| Diameter (m) | 10 | 10 |
| Height (m) | 2.67 | 2.64 |
| Catalyst Volume (m3) | 210 | 208 |

In Table 4 the performance of a process according to Table 3 is shown. It is noted that the performance may be obtained either based on firing of a support fuel or by providing a thermal buffer. With a net flow of thermal buffer of $-11$ m$^3$/h during sub-autothermal operation an excess volume of 22 m$^3$ would be required for 2 hours of sub-autothermal operation. The net flow of $+21.5$ m$^3$/h indicates that about 1 hour of super-autothermal operation is sufficient for creating the buffer capacity required for 2 hours of sub-autothermal operation, but in addition for a period of time it is required to provide an additional net flow of salt during the transient period, which initially would be $-15.4$ m$^3$/h.

TABLE 4

|  | High SO$_2$, Steady State | Low SO$_2$, (after 2 hr) | Low-High SO$_2$, Transient |
|---|---|---|---|
| SO$_2$ Inlet first bed | 5.4% | 0.46% | 5.4% |
| SO$_2$ Outlet first bed | 0.71% | 50 ppmv | 0.71% |
| SO$_2$ Inlet second bed | 0.71% | 50 ppmv | 0.71% |
| SO$_2$ Outlet second bed | 900 ppmv | 30 ppmv | 1000 ppmv |
| T Inlet first bed | 400° C. | 400° C. | 400° C. |
| T Outlet first bed | 533° C. | 414° C. | 414° C. |
| T Inlet second bed | 400° C. | 400° C. | 400° C. |
| T Outlet second bed | 417° C. | 400° C. | 400° C. |
| Support fuel | 0 | 122 kg/h | 171 kg/h |
| Warm salt net flow | +21.5 m$^3$/h | $-11$ m$^3$/h | $-15.4$ m$^3$/h |

An illustration of another embodiment of the present disclosure is presented below, in the form of the processing unit from the previous example, but operated according to FIG. 4, with a bypass 36 of the first catalytic bed. The feed gas 32 is directed to the bypass 36 when the SO$_2$ content in the feed gas is low, e.g. as in feed gas 2 from example 1.

Steady state performance and initial Low-High Transient performance (i.e. the temperature profile corresponding to feed gas 2 steady state, with the inlet composition of feed gas 1) is shown in Table 5.

TABLE 5

|  | High SO$_2$, Steady State | Low SO$_2$, Steady State | Low-High SO$_2$, Transient |
|---|---|---|---|
| SO$_2$ Inlet first bed | 5.4% | N.A. (by-passed) | 5.4% |
| SO$_2$ Outlet first bed | 0.71% | N.A. (by-passed) | 0.71% |
| SO$_2$ Inlet second bed | 0.71% | 0.46% | 0.71% |
| SO$_2$ Outlet second bed | 900 ppmv | 50 ppmv | 758 ppmv |
| T Inlet first bed | 400° C. | N.A. (by-passed) | 400° C. |
| T Outlet first bed | 533° C. | N.A. (by-passed) | 533° C. |
| T Inlet second bed | 400° C. | 400° C. | 400° C. |
| T Outlet second bed | 417° C. | 414° C. | 414° C. |

The examples demonstrate that a converter according to the disclosed embodiment may provide an improved conversion performance during feed gas transients.

It is also a benefit, that a converter according to the disclosure will provide a good heat recovery in an intermediate heat exchanger 12 positioned after the first bed (high outlet temperature) when the SO$_2$ concentration is high and the energy is needed for heating the large volume of feed gas. At low SO$_2$ concentration, no heat will be recovered in the intermediate heat exchanger 12 and support energy is needed in 52. However, even though support energy is still required, the advantage is that it is simpler to control the plant in a stable and robust manner.

It is also seen that the temperature profiles in the converter is almost stable and accordingly the mechanical durability of the unit will be improved due to reduced strain from repeated heating and cooling cycles.

Figure 5:
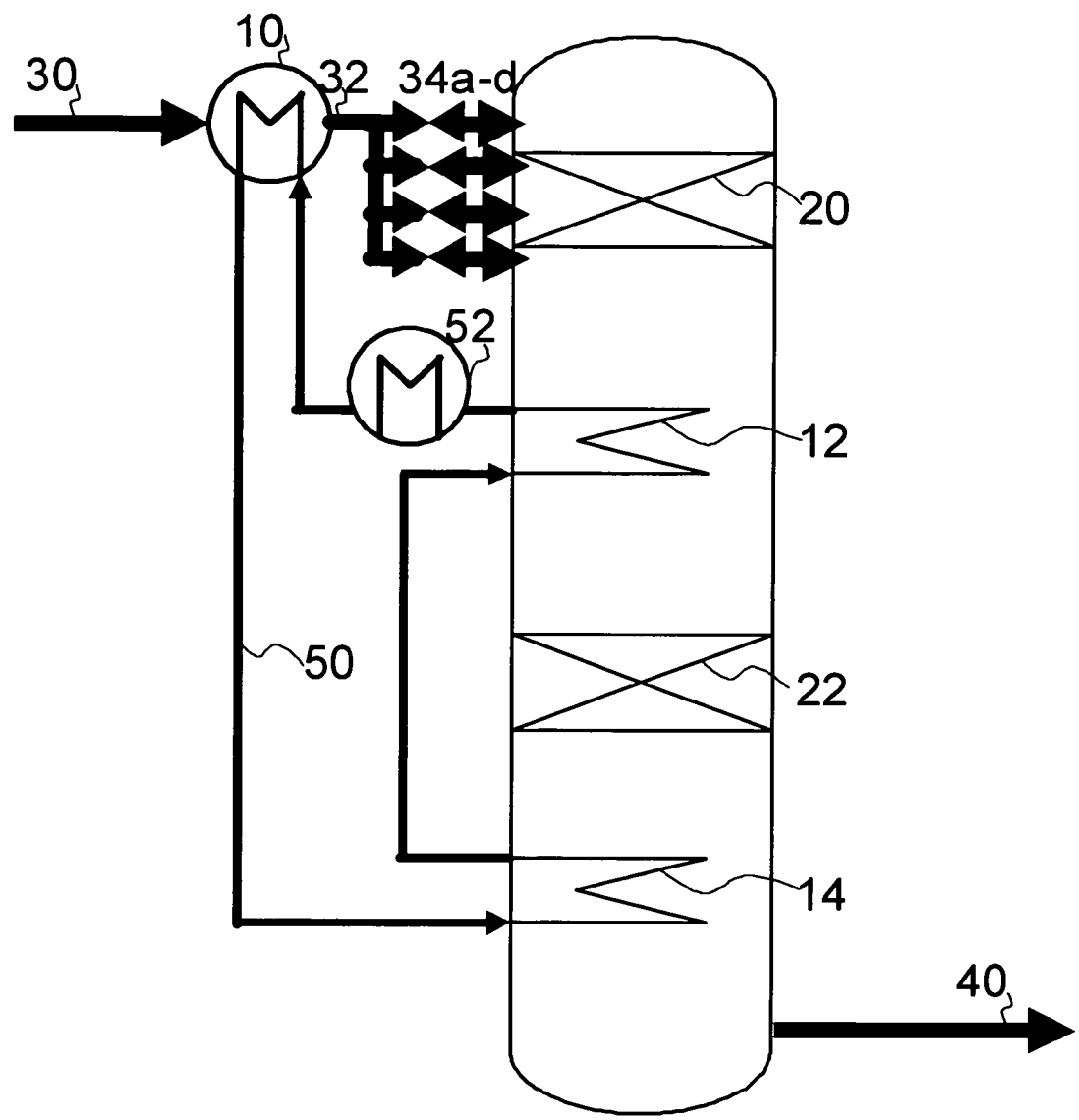
FIG. 5 represents a sulphur dioxide oxidation reactor having multiple input lines according to an embodiment of the disclosure.

In a further exemplary embodiment according to FIG. 5 the definition of the catalytic reaction zone is made in more detail. The catalytic conversion reactor of this embodiment is proposed to have multiple input lines 34a-d in different distances from the beginning of the catalytic zone. Each such input line (except the first) may be preceded by a heat exchanger corresponding to the heat exchange 52, cooling the reacting gas to a desirable input temperature of the section of catalytically active material to provide a favourable temperature with respect to the equilibrium between SO$_2$ and SO$_3$. The catalytic reaction zone will therefore be dependent on the inlet chosen, and may preferably be chosen according to the SO$_2$ level in the gas, or other process parameters. In this way the active catalytic reaction zone may be tailored more closely to the requirements, with a possibility for better operation. The determination of SO$_2$ content may be provided from a detailed process knowledge, e.g. of the origin of the feed gas, from a process simulation or a measurement of SO$_2$ in the feed gas.

Figure 6:
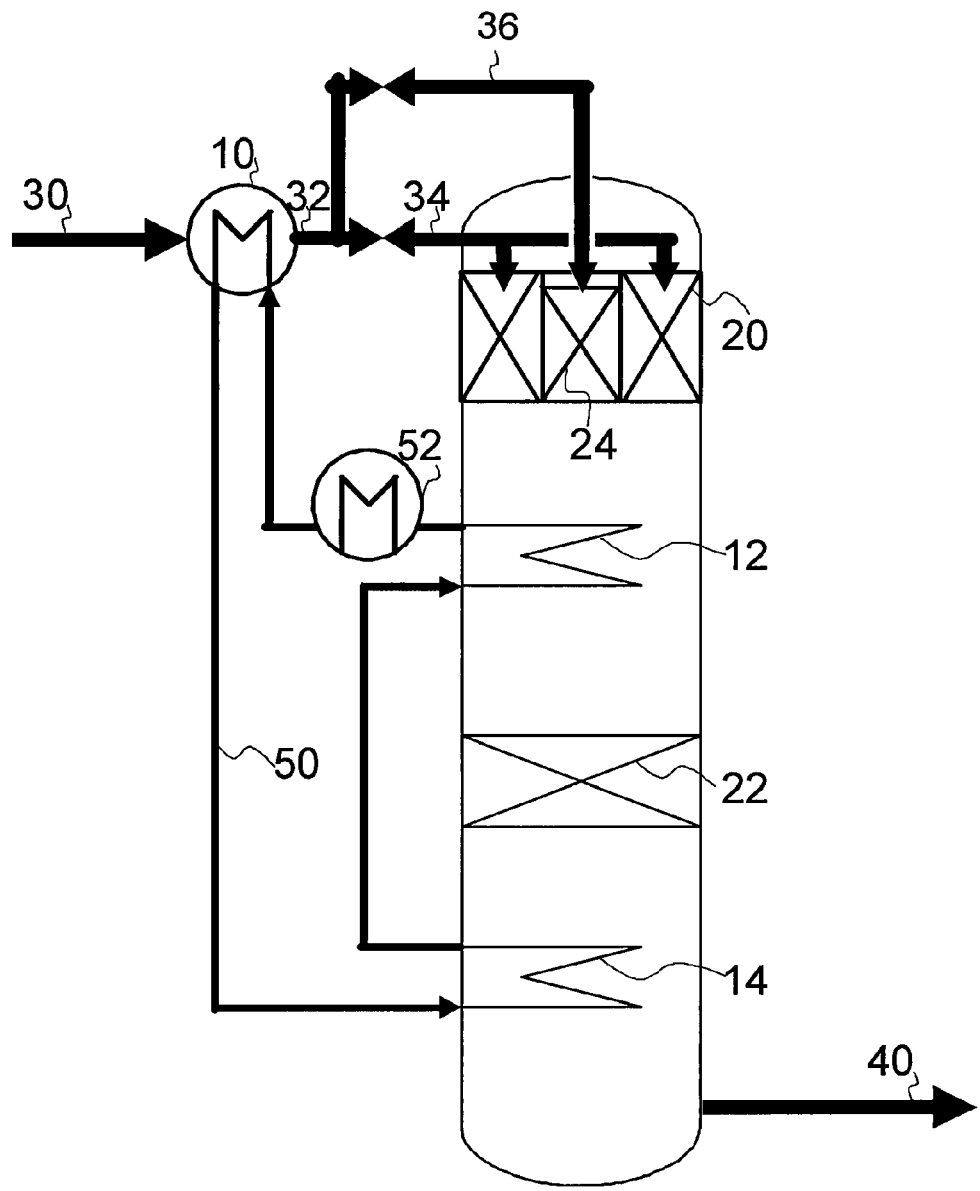
FIG. 6 represents a sulphur dioxide oxidation reactor having sections of catalytically active material according to an embodiment of the disclosure.

In another exemplary embodiment illustrated in FIG. 6, the catalytic oxidation reactor is designed to have at least two parallel reaction zones 20 and 24, in at least a part of the reactor. Dependent on the SO$_2$ content and the volumetric flow rate it may be preferred to pass the process gas 32 through both parallel reaction zones 20 and 24 in the case of high flow rate or high SO$_2$ content, where a high conversion is required, whereas when a high conversion is not required only a part of the parallel reaction zones (e.g. 24) may be used, in order to maintain a high temperature in the major part of the reactor. Such parallel reaction zones 20 and 24 may be arranged as an outer cylinder 20 with one or more inner cylinders 24, with valves controlling that the gas flow (34 and 36) is directed to the cylinders as they are required to be operating or non-operating. Compared to a by-pass of the previous embodiment the embodiment of FIG. 6 may provide a higher conversion of SO$_2$ in the case of low SO$_2$. Naturally other implementations of this embodiment are possible, e.g. with other shapes than cylindrical, and with other relative arrangements of operating and non-operating sections.

In a further exemplary embodiment the catalyst is arranged as catalysed hardware, e.g. as one or more reactors which may be tubular, having a thin film of catalytically active material on an inner surface of the tubes, as described e.g. in EP 0 949 001, with the benefit of reduced pressure drop in the catalytic reaction zone. In this embodiment multiple reactor sections may be operated in parallel, in a way similar to the embodiment of FIG. 6. During process conditions requiring a large catalytical reaction zone, all channels may be operated, whereas under conditions not requiring a high conversion one or more sections of the catalytically active material are diverted, and the majority of the feed gas is directed through the remaining sections.

In an alternative embodiment, the reactor system for $SO_2$ oxidation may also be configured as two independent reactors operating in series. A benefit of this embodiment is that these reactors may be configured independently, e.g. with the catalyst arranged in beds or arranged as catalysed hardware, and the configuration of feed gas flow may be controlled as in the previous embodiments, based on either knowledge of the source of the $SO_2$ feed gas or a determination of the $SO_2$ concentration by a measurement or a calculation.

Figure 7:
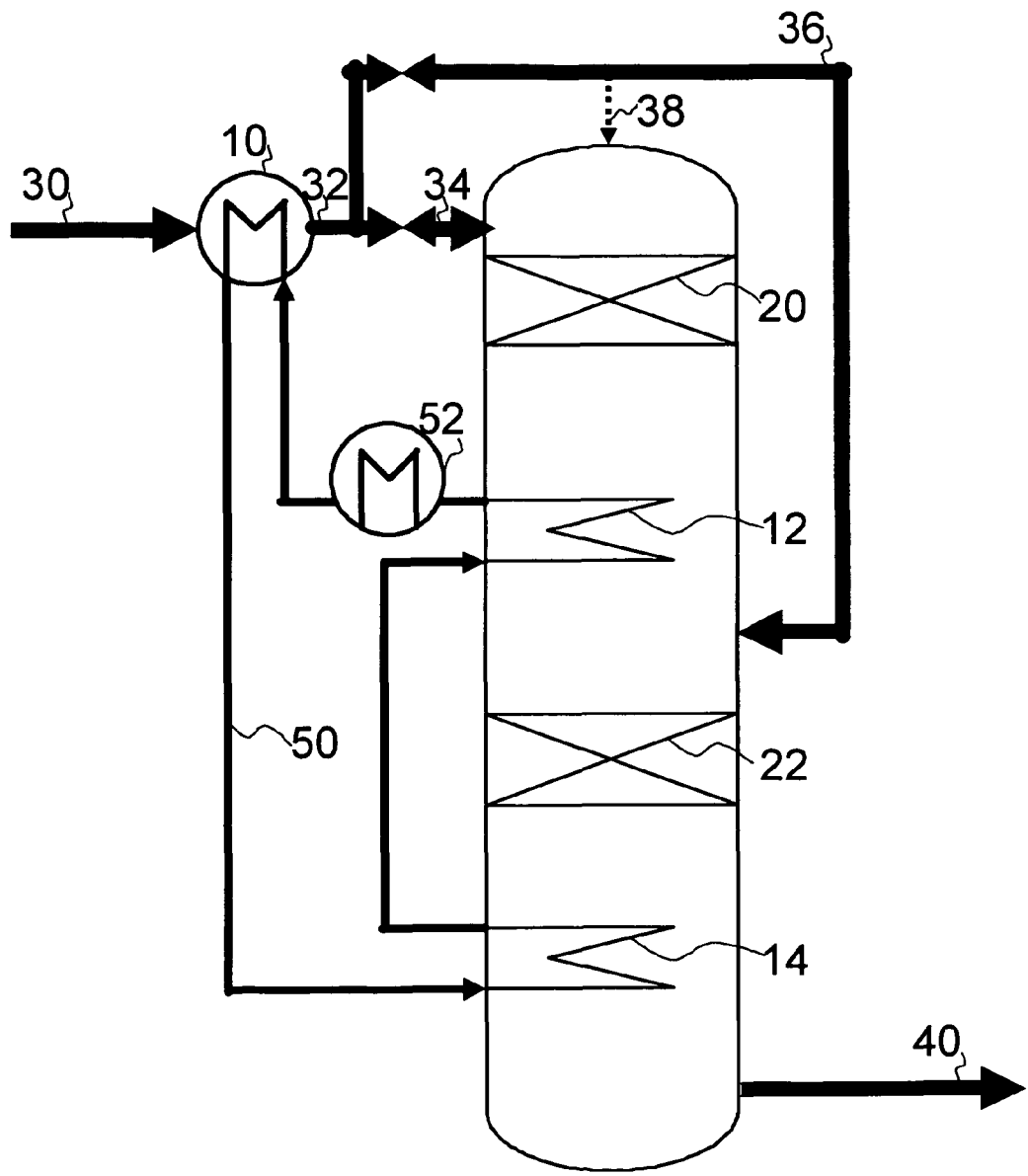
FIG. 7 represents a sulphur dioxide oxidation reactor have a minor flow in a non-operating section of catalytically active material according to an embodiment of the disclosure.

In an additional exemplary embodiment according to FIG. 7, during periods with a non-operating section of the catalytically active material, the reactor may still be configured for the non-operating section of the catalytically active material to be in contact with a minor fraction 37 of the flow of heated feed gas or another heated gas, which may be directed through the non-operating section 20 of catalytically active material. Such a flow will counteract convective heat transfer internally in the catalytically active material, and thus contribute to maintain a section with high temperature and thus high reaction rates. The implementation of this embodiment may be made by configuring line 34 to allow the minor fraction of heated gas to enter the non-operating section of catalytically active material.

In an additional exemplary embodiment, the process parameter monitored may comprise the temperature in one or more positions of the reactor. According to the trend of the monitored temperature the feed gas may be redirected to pass a desired reactor sub-section, which may be one of several parallel catalytic reaction zones or one of several serial catalytic reaction zones, as described above. Such an embodiment will provide the benefit of detailed process knowledge, from a temperature measurement, which may be simpler and less expensive compared to a gas analysis.

In the exemplary embodiments where two catalytic reaction zones or reactors have been described, embodiments with three or more sections of catalytically active materials may of course also be used with the potential benefit of further conversion in subsequent reactor zones.

The invention claimed is:

1. A process for the conversion of sulphur dioxide contained in a feed gas to sulphur trioxide, comprising the steps of:
    a) providing a process gas containing sulphur dioxide by alternatingly providing a first feed gas containing a high concentration of sulphur dioxide sufficient for autothermal operation and a second feed gas containing a low concentration of sulphur dioxide insufficient for autothermal operation as a process gas;
    b) preheating the process gas by heat exchange with a heat exchange medium;
    c) reacting the process gas in the presence of a catalytically active material in a catalytic reaction zone, thereby converting by sulphur dioxide oxidation at least in part the sulphur dioxide of the process gas into sulphur trioxide contained in a product gas in the catalytic reaction zone;
    d) cooling the product gas by contact with a heat exchange medium;
    e) providing a thermal buffer zone for collecting and storing energy in relation to one of said process steps,
    wherein:
        when the first feed gas is used, step (c) is under super-autothermal operation condition and thermal energy is collected and stored in the thermal buffer zone; and
        when the second feed gas is used, step (c) is under sub-autothermal operation condition and the collected and stored thermal energy in the thermal buffer zone is used to provide the thermal energy.

2. A process according to claim 1, wherein the thermal buffer zone is provided as a variable volume of warm heat exchange medium.

3. A process according to claim 1, wherein the thermal buffer zone is a catalytically active reaction zone being by-passed during sub-autothermal conditions.

4. A process according to claim 1, wherein the thermal buffer zone is a zone of inert material configured for being by-passed.

5. A process according to claim 1, wherein the thermal buffer zone is operated in dependence of a process parameter related to process inlet conditions.

6. A process according to claim 5, wherein said one or more process parameters are taken from the group consisting of temperature, sulphur dioxide concentration, sulphur tri-oxide concentration, pressure, mass flow of feed gas and volume flow of feed gas.

7. A process according to claim 1, wherein the thermal buffer zone is configured for being in thermal contact with the process gas, providing thermal energy for heating the process gas if the process gas is said first feed gas and withdrawing thermal energy from the process gas if the process gas is said second feed gas.

8. A process according to claim 1, wherein said first feed gas having a sulphur concentration above 3% vol and below 20% vol.

9. A process according to claim 1, wherein said process gas is obtainable alternatingly from at least a first source and a second source, wherein the ratio between the sulphur dioxide content of the process gas from said first source and said second source, is above 1.5.

10. A process according to claim 1, wherein said process gas is obtained from a pyrometallurgical plant, from which the first feed gas source is an off-gas from operation of a metal ore roaster and said second feed gas source is an off gas from operation of a metal ore smelter electric furnace.

11. A process for the production of sulphuric acid, comprising the steps of:
    a) providing a process gas containing sulphur dioxide by alternatingly providing a first feed gas containing a high concentration of sulphur dioxide sufficient for autothermal operation and a second feed gas containing a low concentration of sulphur dioxide insufficient for autothermal operation as a process gas;
    b) preheating the process gas by heat exchange with a heat exchange medium;
    c) reacting the process gas in the presence of a catalytically active material in a catalytic reaction zone, thereby converting by sulphur dioxide oxidation at least in part the sulphur dioxide of the process gas into sulphur trioxide contained in a product gas in the catalytic reaction zone;
    d) cooling the product gas by contact with a heat exchange medium;
    e) providing a thermal buffer zone for collecting and storing energy in relation to one of said process steps;

wherein:
when the first feed gas is used, step (c) is under super-autothermal operation condition and thermal energy is collected and stored in the thermal buffer zone; and
when the second feed gas is used, step (c) is under sub-autothermal operation condition and the collected and stored thermal energy in the thermal buffer zone is used to provide the thermal energy; and
(f) feeding the product gas from step (d) containing the generated sulphur trioxide to an absorber or a condenser and hydrating said sulphur trioxide-containing product gas therein to form sulphuric acid.

\* \* \* \* \*